(12) United States Patent
Lin et al.

(10) Patent No.: US 11,086,697 B2
(45) Date of Patent: Aug. 10, 2021

(54) BROADCAST-CONTROLLING METHOD IN OPERATING SYSTEM AND MOBILE TERMINAL

(71) Applicant: Guangdong OPPO Mobile Telecommunications Corp., Ltd., Guangdong (CN)

(72) Inventors: Zhiyong Lin, Guangdong (CN); Runsheng Pei, Guangdong (CN); Liangjing Fu, Guangdong (CN); Ruyu Wu, Guangdong (CN); Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 12 days.

(21) Appl. No.: 16/565,467

(22) Filed: Sep. 9, 2019

(65) Prior Publication Data

US 2020/0007578 A1     Jan. 2, 2020

Related U.S. Application Data (63) Continuation of application No. PCT/CN2017/106608, filed on Oct. 17, 2017.

(30) Foreign Application Priority Data

Mar. 10, 2017   (CN) .......................... 201710144290.0

(51) Int. Cl.
*G06F 9/54* (2006.01)
*H04H 20/72* (2008.01)
(Continued)

(52) U.S. Cl.
CPC ............. *G06F 9/542* (2013.01); *H04H 20/72* (2013.01); *H04L 63/1483* (2013.01);
(Continued)

(58) Field of Classification Search
CPC ............ G06F 9/542; G06F 9/546; G06F 9/54; H04L 63/1483; H04L 65/4076;
(Continued)

(56) References Cited

U.S. PATENT DOCUMENTS 6,584,101 B2 *   6/2003  Hagglund ............. H04L 12/427
                                                    370/389
8,565,841 B2 *  10/2013  Usui ................. H04W 52/0261
                                                    455/574
(Continued)

FOREIGN PATENT DOCUMENTS

CN      101997821 A    3/2011
CN      103823699 A    5/2014
(Continued)

OTHER PUBLICATIONS

European search report,European Application No. EP17899953.8, dated Dec. 4, 2019 (35 pages).
(Continued)

*Primary Examiner* — Oleg Korsak
*Assistant Examiner* — Feliciano S Mejia
(74) *Attorney, Agent, or Firm* — Young Basile Hanlon & MacFarlane, P.C.

(57) ABSTRACT

A broadcast-controlling method in an operating system and a mobile terminal are provided. The broadcast-controlling method includes obtaining a number of broadcast types registered by a first application, wherein the first application receives broadcast messages according to the registered broadcast types; determining whether the number of broadcast types is greater than a first threshold; determining the first application as an illegal broadcast-registering application when the number of broadcast types is greater than the first threshold; obtaining a receiver queue of a target broad-
(Continued)

cast; and optimizing the receiver queue according to determined illegal broadcast-registering applications.

13 Claims, 5 Drawing Sheets

(51) Int. Cl.
    *H04L 29/06*     (2006.01)
    *H04W 12/121*     (2021.01)
    *H04W 12/122*     (2021.01)

(52) U.S. Cl.
    CPC ....... *H04L 65/4076* (2013.01); *H04W 12/121* (2021.01); *H04W 12/122* (2021.01)

(58) Field of Classification Search
    CPC ........... H04W 12/1201; H04W 2/1204; H04W 4/06; H04W 52/0209; H04W 52/0225; H04W 12/12
    See application file for complete search history.

(56) References Cited

U.S. PATENT DOCUMENTS

| | | | |
|---|---|---|---|
| 9,083,434 B2 * | 7/2015 | Gunnarsson | H04B 7/2606 |
| 10,237,158 B2 * | 3/2019 | Hu | H04L 12/1886 |
| 10,635,510 B2 * | 4/2020 | Huang | G06F 9/542 |
| 10,740,161 B2 * | 8/2020 | Guo | H04L 47/621 |
| 2012/0151589 A1 * | 6/2012 | Hershey | H04L 63/1441 726/24 |
| 2014/0282637 A1 * | 9/2014 | Park | H04N 21/482 725/5 |
| 2016/0316260 A1 * | 10/2016 | Dewa | H04N 21/44204 |
| 2016/0323170 A1 | 11/2016 | Hu et al. | |
| 2016/0359862 A1 * | 12/2016 | Riva | G06F 21/6218 |
| 2017/0041663 A1 * | 2/2017 | Kitazato | H04N 21/443 |
| 2019/0199648 A1 * | 6/2019 | Chen | H04L 47/806 |

FOREIGN PATENT DOCUMENTS

| | | |
|---|---|---|
| CN | 104580100 A | 4/2015 |
| CN | 105208590 A | 12/2015 |
| CN | 105357648 A | 2/2016 |
| CN | 105528254 A | 4/2016 |
| CN | 106095064 A | 11/2016 |
| CN | 106102141 A | 11/2016 |
| CN | 106201740 A | 12/2016 |
| CN | 106937258 A | 7/2017 |
| WO | 2015105222 A1 | 7/2015 |

OTHER PUBLICATIONS

English translation of First Office Action fin a counterpart Chinese patent Application No. 201710144290.0, dated Mar. 25, 2019.
International search report,PCT/CN2017/106608, dated Dec. 28, 2017.
Indian First Examination Report for in Application No. 201917039869 dated May 10, 2021 (7 pages).

* cited by examiner

BROADCAST-CONTROLLING METHOD IN OPERATING SYSTEM AND MOBILE TERMINAL

CROSS-REFERENCE TO RELATED APPLICATION(S)

This application is a continuation of International (PCT) Patent Application No. PCT/CN2017/106608 filed on Oct. 17, 2017, which claims priority to Chinese Patent Application No. 201710144290.0, filed on Mar. 10, 2017, the contents of which are herein incorporated by reference in their entireties.

TECHNICAL FIELD

The present disclosure relates to the field of broadcast mechanism, and in particular to a broadcast-controlling method and a mobile terminal.

BACKGROUND

In the Android system, broadcast is a mechanism widely used among applications for information transmission. The Android system notifies a component for each application of some system events such as geographical change, low battery, and incoming call information by issuing broadcast messages. These messages are usually called system broadcast messages. Third-party applications can also send broadcast messages, which are called custom broadcast messages.

SUMMARY

According to one aspect of the present disclosure, a broadcast-controlling method is provided in an operating system. The broadcast-controlling method includes obtaining a number of broadcast types registered by a first application, wherein the first application receives broadcast messages according to the registered broadcast types; determining whether the number of broadcast types is greater than a first threshold; determining the first application as an illegal broadcast-registering application when the number of broadcast types is greater than the first threshold; obtaining a receiver queue of a target broadcast; and optimizing the receiver queue according to determined illegal broadcast-registering applications.

According to another aspect of the present disclosure, a mobile terminal is provided, which includes a non-transitory memory storing a computer program, and a processor, wherein the processor is configured to execute the computer program to a broadcast-controlling method, and the method includes obtaining a receiver queue of a target broadcast; and optimizing the receiver queue according to whether an illegal broadcast-registering application is in the receiver queue, wherein a first application registering to receive a number of broadcast types greater than a first threshold in the receiver queue is determined as the illegal broadcast-registering application.

According to yet another aspect of the present disclosure, a non-transitory storage medium is provided, which stores a computer program, when executed, causing a processor to perform a broadcast-controlling method, wherein the method includes obtaining a receiver queue of a target broadcast; and disabling an illegal receiver in the receiver queue to receive the target broadcast, wherein the illegal receiver in the receiver queue registers to receive a number of broadcast types greater than a first threshold.

DETAILED DESCRIPTION

The present disclosure will be described in details below with reference to the drawings and embodiments. It should be understood that, the embodiments described herein are used to explain the disclosure and not to limit the disclosure. In addition, it is also to be noted that, for convenience of description, only parts relevant to the disclosure, instead of all contents are illustrated in the drawings.

Before discussing the exemplary embodiments in more detail, it should be noted that, some embodiments are described as a method or process as depicted in the flowchart. Although the flow chart may describe each step as a process to be performed in order, many of the steps may be performed in parallel, concurrently or simultaneously. Further, the order of the steps may be rearranged. When an operation is completed, the process may be terminated, but may contain additional steps that are not shown in the drawings. The process may relate to a method, a function, a procedure, a sub-routine, a sub-program and the like.

With the development of technology, some illegal applications have appeared. In order to achieve some illegal purposes, illegal applications often self-start by receiving various broadcasts in the background. Since the illegal application needs to occupy the broadcast queue for receiving the broadcast, which makes response of other applications to the broadcast delayed and then affects the response time of other applications to the broadcast message. In addition, an illegal application's starting in the background will cause system power consumption and resource consumption.

A broadcast-controlling method is provided in an operating system. The broadcast-controlling method includes obtaining a number of broadcast types registered by a first application, wherein the first application receives broadcast messages according to the registered broadcast types; determining whether the number of broadcast types is greater than a first threshold; determining the first application as an illegal broadcast-registering application when the number of broadcast types is greater than the first threshold; obtaining a receiver queue of a target broadcast; and optimizing the receiver queue according to determined illegal broadcast-registering applications.

In one embodiment, the broadcast-controlling method further includes determining whether a number of receivers in the receiver queue is greater than a second threshold; and optimizing the receiver queue according to the determined illegal broadcast-registering applications when the number of receivers in the receiver queue is greater than the second threshold.

In one embodiment, the second threshold is determined by a period in which all the receivers in the receiver queue receive or respond the target broadcast.

In one embodiment, wherein the optimizing the receiver queue according to the determined illegal broadcast-registering applications includes deleting the determined illegal broadcast-registering applications from the receiver queue.

In one embodiment, the optimizing the receiver queue according to the determined illegal broadcast-registering applications includes deleting any associated application having data interaction with any of the determined illegal broadcast-registering applications from the receiver queue.

In one embodiment, the optimizing the receiver queue according to the determined illegal broadcast-registering applications includes remaining any of the determined illegal broadcast-registering applications in the receiver queue when the any of the illegal broadcast-registering applications is located in a preset application list.

In one embodiment, the preset application list includes safe broadcast-registering applications which have been identified by the operating system or determined according to use habits of a target user.

In one embodiment, the optimizing the receiver queue of the broadcast according to the determined illegal broadcast-registering applications includes moving the determined illegal broadcast-registering applications toward a tail of the receiver queue such that the receiver queue is rearranged.

In one embodiment, the determined illegal broadcast-registering applications are rearranged at the tail of the receiver queue.

In one embodiment, the broadcast-controlling method further includes sending the number of broadcast types registered by the first application to a server, wherein the first threshold is determined by the server according to numbers of broadcast types registered by at least one application.

A mobile terminal is provided, which includes a non-transitory memory storing a computer program, and a processor, wherein the processor is configured to execute the computer program to a broadcast-controlling method, and the method includes obtaining a receiver queue of a target broadcast; and optimizing the receiver queue according to whether an illegal broadcast-registering application is in the receiver queue, wherein a first application registering to receive a number of broadcast types greater than a first threshold in the receiver queue is determined as the illegal broadcast-registering application.

In one embodiment, the receiver queue is optimized when a number of receivers in the receiver queue is greater than a second threshold.

In one embodiment, the second threshold is determined by a period in which all the receivers in the receiver queue receive or respond the target broadcast.

In one embodiment, the optimizing the receiver queue includes deleting determined illegal broadcast-registering applications from the receiver queue.

In one embodiment, the optimizing the receiver queue includes deleting any associated application having data interaction with any of the determined illegal broadcast-registering applications.

In one embodiment, the optimizing the receiver queue includes remaining any of determined illegal broadcast-registering applications in the receiver queue when the any of the determined illegal broadcast-registering applications is located in a preset application list.

In one embodiment, the preset application list includes safe broadcast-registering applications which have been identified by the operating system or determined according to use habits of a target user.

In one embodiment, the optimizing the receiver queue includes moving determined illegal broadcast-registering applications towards a tail of the receiver queue such that the receiver queue is rearranged.

In one embodiment, the determined illegal broadcast-registering applications are rearranged at the tail of the receiver queue.

A non-transitory storage medium is provided, which stores a computer program, when executed, causing a processor to perform a broadcast-controlling method, wherein the method includes: obtaining a receiver queue of a target broadcast; and disabling an illegal receiver in the receiver queue to receive the target broadcast, wherein the illegal receiver in the receiver queue registers to receive a number of broadcast types greater than a first threshold.

Figure 1:
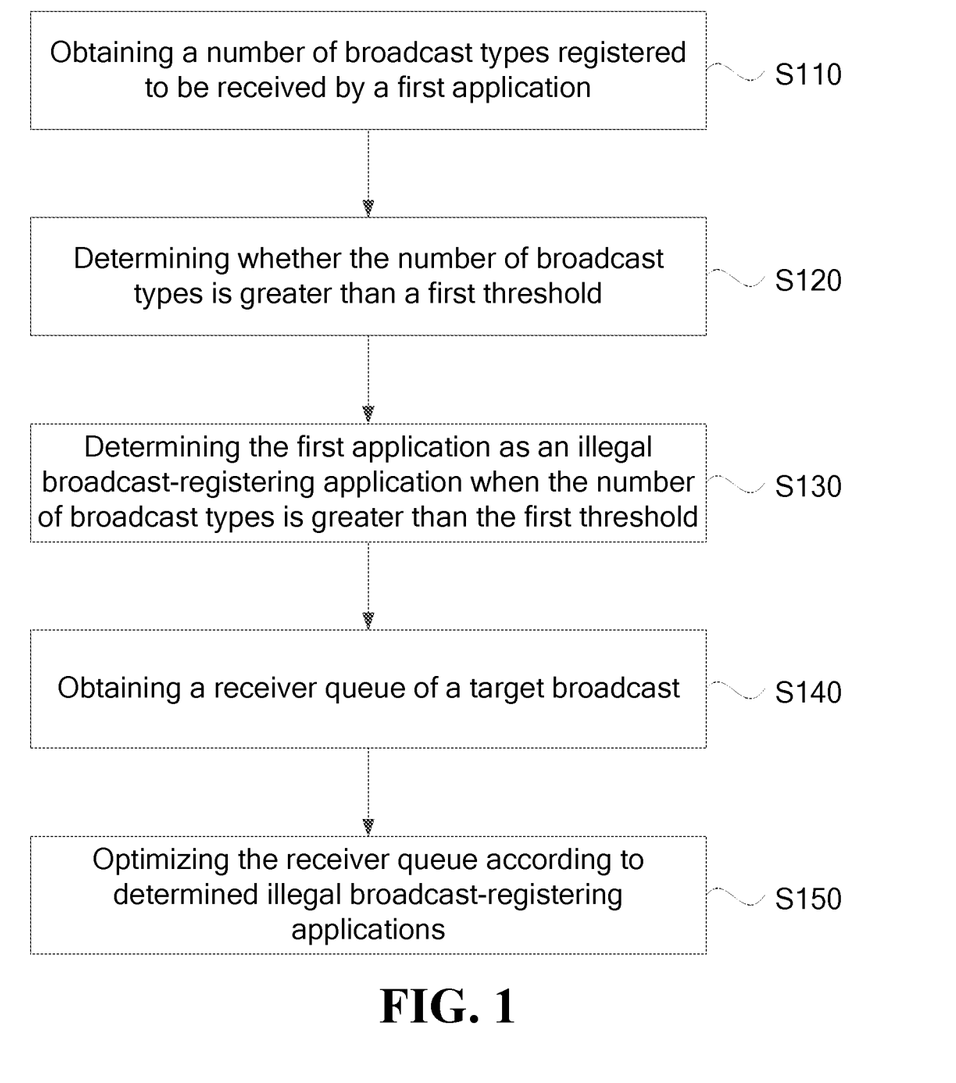
FIG. 1 is a flow chart illustrating a broadcast-controlling method according to some embodiments of the present disclosure.

FIG. 1 is a flowchart illustrating a broadcast-controlling method according to some embodiments of the present disclosure. The method is applicable to a case where an illegal broadcast-registering application receives a broadcast message registered to be received, which means that the illegal broadcast-registering application registers to receive the broadcast message, and then starts on its own. The method may be performed by a control apparatus for a broadcast. The apparatus may be realized by software and/or hardware, and may be integrated in a mobile terminal.

As shown in FIG. 1, the broadcast-controlling method includes the following actions/operations.

At block S110, the method obtains a number of broadcast types registered to be received by a first application.

Since the broadcast mechanism is a mechanism for message subscription/release, the first step to use a broadcast, which is a message-driven model, is to subscribe to a message. To subscribe a broadcast may be that a broadcast receiving unit of an application is registered to receive the broadcast. In this way, when a broadcast message is issued, the broadcast message may be sent to applications that has subscribed to the broadcast message through the receiving unit registered to receive, so that the control functions of the application are implemented. Self-starting, data storage, and self-shutdown of the application can be realized.

The first application may be a system application or a third-party application. Since the technical solution according to an embodiment of the present disclosure is mainly for an illegal broadcast-registering application, the first application mainly refers to a third-party application.

Broadcast types include, but are not limited to, power-on/off, network switching, audio-switching, screen brightness adjustment, and screen unlocking. In addition, since third-party applications can also issue broadcast messages, the broadcast type can also include types of broadcast messages issued by system applications and third-party applications. Exemplarily, after the mobile terminal powers on, the system will issue a broadcast message for power-on, which triggers some functions such as a screen-touch function and can also enable some applications such as a boot assistant and an anti-virus software. The boot assistant and the anti-virus software subscribe to the broadcast message for power-on. A manner of subscription may be that the broadcast receiving unit of the application is registered to receive the broadcast message in the above example.

Correspondingly, there may include multiple types of broadcast message subscribed by one application. For example, an anti-virus software may also subscribe a type of network switching and multiple types of broadcast messages issued by other system applications and third-party applications besides the type of power-on/off. A type of broadcast message registered to be received by an application may be recorded in the broadcast receiving unit. The number of broadcast types registered to be received by the application may be obtained from the broadcast receiving unit in a manner of reading.

The number of broadcast types registered to be received by the first application may be stored in the broadcast receiving unit of the first application. The number of broadcast types registered to be received by each application may also be stored in the system broadcast manager. In this way, when it is necessary to acquire the number of broadcast types registered to be received by one application, data can be directly called.

At block S120, the method determines whether the number of broadcast types is greater than a first threshold.

The first threshold may be set before the device leaves the factory, or may be a standard value that is counted according to a large amount of data, which is about numbers of broadcast types registered to be received by many applications in a process of using the device. For example, the number of broadcast types registered to be received by a general application is about 20 according to statistics, and then the first threshold may be set to be 30.

After the number of broadcast types registered to be received by the application is obtained, a size relationship between the number of broadcast types and the first threshold is determined. A manner of determining may be implemented by a comparator.

At block S130, the method determines the first application as an illegal broadcast-registering application when the number of broadcast types is greater than the first threshold.

The illegal broadcast-registering application may register to receive a lot of broadcast types in the system broadcast manager. Once there is a broadcast messages registered to be received by the illegal broadcast-registering application to be released, the illegal broadcast-registering application may self-start after receiving the broadcast message. The self-starting of the illegal broadcast-registering application not only consumes system memory and energy, but also occupies a thread for sending broadcast messages after registered to receive the broadcast message, so that other applications respond to the broadcast message at a slower speed, and may also cause a problem of the thread for sending broadcast messages being jammed.

For example, when the number of broadcast types registered to be received by an application is 68 and the first threshold is set to be 30, the number of broadcast types registered to be received by this application is significantly larger than that by a general application, and this application can be determined as the illegal broadcast-registering application.

At block S140, the method obtains a receiver queue of a target broadcast.

The target broadcast may be any broadcast. The receiver queue of the target broadcast can be obtained in the system broadcast manager. The receiver queue of the target broadcast contains all the applications that register to receive the target broadcast.

For example, in the ActivityManagerService, many broadcast types are included. All applications register corresponding broadcast receiving units to the ActivityManagerService. A sender of a broadcast also sends the broadcast to the ActivityManagerService, when the system or an application needs to release the broadcast after subscribing a broadcast of interest. The ActivityManagerService searches for receivers of the broadcast in the receiver queue, and then distributes the broadcast to the receivers who registers to receive the broadcast.

At block S150, the method optimizes the receiver queue according to determined illegal broadcast-registering applications.

Since the broadcast receivers exists in the thread in the form of a queue, a speed at which other applications obtain and respond the broadcast message will be affected if there is an illegal broadcast-registering application in the receiver queue and the illegal broadcast-registering application is located at the front of the receiver queue. Therefore, whether the receiver queue contains any illegal broadcast-registering application may be determined after the receiver queue is obtained. When the receiver queue contains any illegal broadcast-registering application, the receiver queue may be optimized. The way of optimizing may include adjusting an order of the receiver queue. The illegal broadcast-registering application contained in the receiver queue is postponed to receive. The way of optimizing may also include deleting the illegal broadcast-registering application from the receiver queue, such that the illegal broadcast-registering application cannot receive the broadcast message to self-start or implement other functions.

Figure 2:
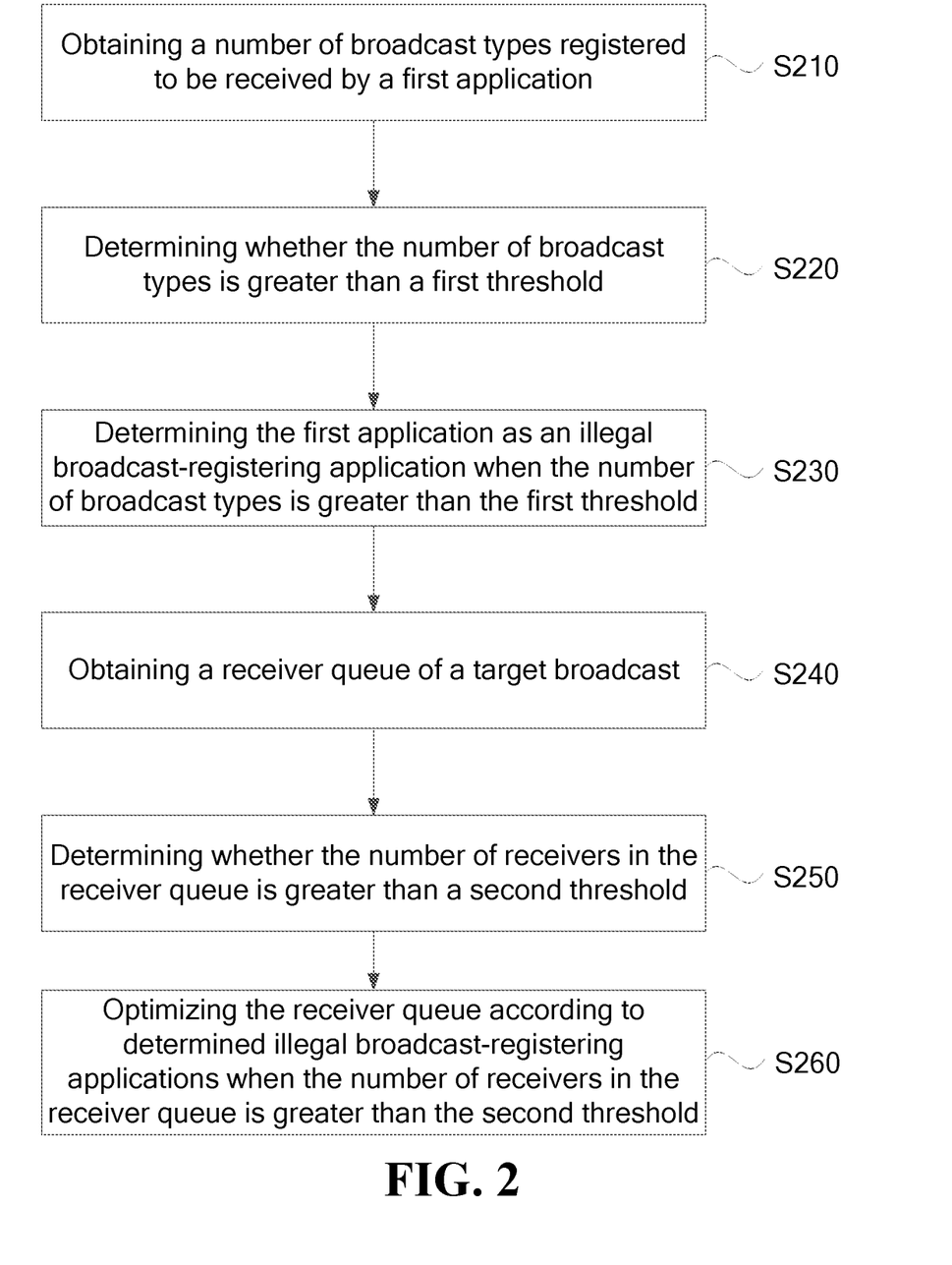
FIG. 2 is a flow chart illustrating a broadcast-controlling method according to some embodiments of the present disclosure.

FIG. 2 is a flowchart illustrating a broadcast-controlling method according to some embodiments of the present disclosure. As shown in FIG. 2, the broadcast-controlling method includes the following actions/operations.

At block S210, the method obtains a number of broadcast types registered to be received by a first application.

At block S220, the method determines whether the number of broadcast types is greater than a first threshold.

At block S230, the method determines the first application as an illegal broadcast-registering application when the number of broadcast types is greater than the first threshold.

At block S240, the method obtains a receiver queue of a target broadcast.

At block S250, the method determines whether the number of receivers in the receiver queue is greater than a second threshold.

The number of receivers is the number of applications registered to receive the target broadcast. For example, for the broadcast type of power-off, the number of applications registering to receive is 135, and thus, the number of receivers in the receiver queue is 135 after the broadcast message of power-off is released.

For the second threshold set for the number of receivers, it may be determined by performing data statistics for a period in which all the receivers receive and/or respond a broadcast message after the broadcast message is released. That is, the second threshold is determined by the period. For example, when the number of receivers in the receiver queue is 50, the period in which all the receivers to receive and/or respond to the broadcast is 50 ms. When the number of receivers in the receiver queue is 100, the period in which all the receivers receive and/or respond the broadcast is 100 ms, and while it exceeds 100 ms, the user will obviously feel the system running slower, then the second threshold may be set to be 100.

At block S260, the method optimizes the receiver queue according to determined illegal broadcast-registering applications when the number of receivers in the receiver queue is greater than the second threshold.

In conjunction with the above examples, when the number of receivers in the receiver queue is greater than the second threshold, that is, greater than 100, the receiver queue is optimized according to the determined illegal broadcast-registering applications. The way of optimizing may be to reorder the receiver queue or delete any illegal broadcast-registering applications from the receiver queue as described in the above technical solution. The manner of reordering the receiver queues may be that moving the illegal broadcast-registering applications towards a tail of the receiver queue, and moving foreground applications towards a head of the receiver queue. In one embodiment, the illegal broadcast-registering applications are rearranged at the tail of the receiver queue.

For example, the second threshold is set to be 100. When the number of receivers in the receiver queue is 120, 25 illegal broadcast-registering applications in the receiver queue is obtained after it is determined that the number of receivers exceeds the second threshold, and then the receiver queue is optimized, and other applications in the receiver queue after optimization can receive and/or respond to broadcast messages.

Based on the foregoing technical solutions, this technical solution provides a determination on the number of receivers in the receiver queue, and reasonably optimizes the receiver queue according to the determination result. It is to be noted that, if the number of receivers in the receiver queue is not greater than the second threshold, the receiver queue may be optimized or not optimized, which is not limited in this technical solution.

Based on the foregoing schemes, optimizing the receiver queue according to the determined illegal broadcast-registering applications includes deleting any determined illegal broadcast-registering applications from the receiver queue. Based on the foregoing schemes, optimizing the receiver queue according to the determined illegal broadcast-registering applications includes deleting any associated applications that have data interaction with any of the illegal broadcast-registering applications in the receiver queue from the receiver queue.

The associated application that has data interaction with an illegal broadcast-registering application may be another application. For example, an application A is determined to be an illegal broadcast-registering application as the number of broadcast types registered to be received by the application A exceeds the first threshold. Another application B has data interaction with the application A when the application A is running in the background. If the application B is in the receiver queue, then the application B is deleted from the receiver queue.

Figure 3:
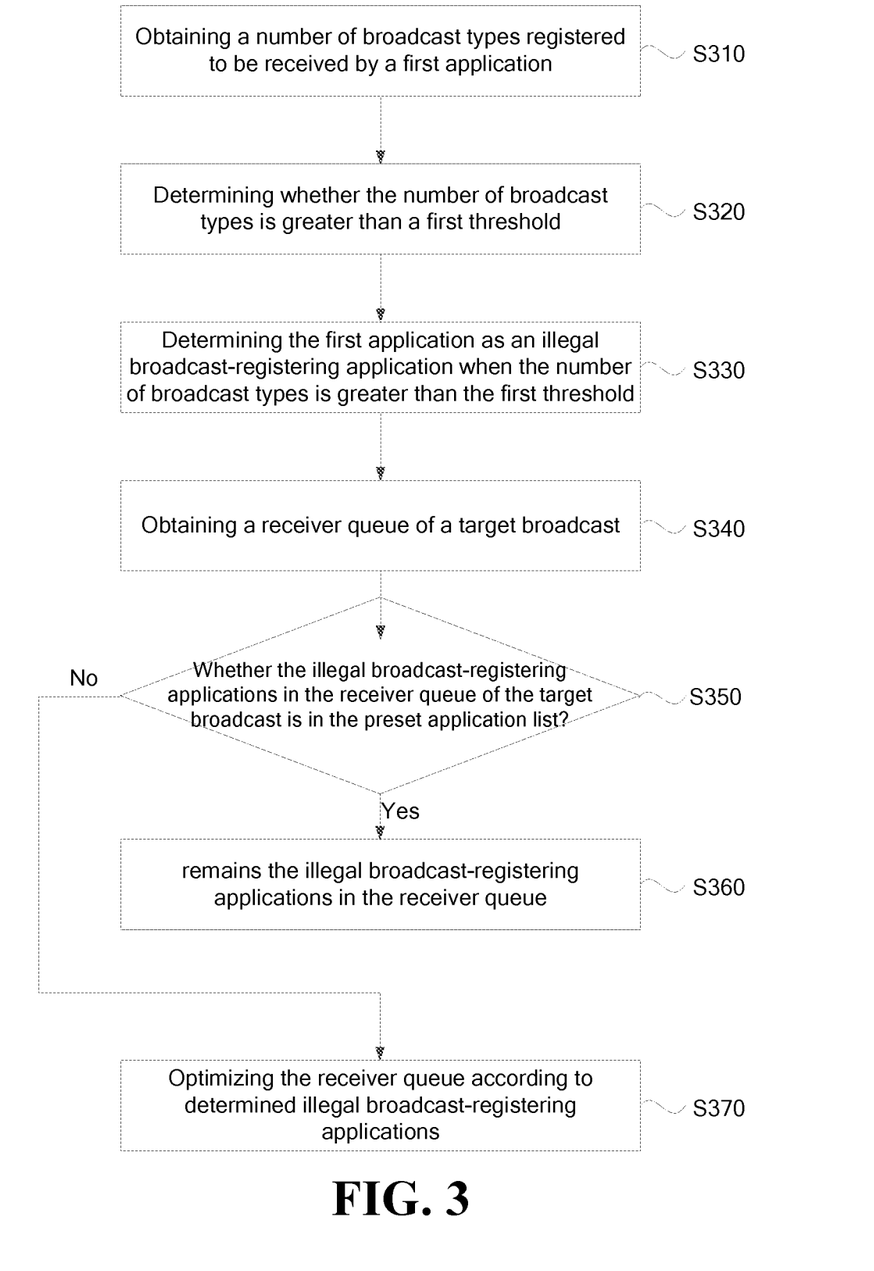
FIG. 3 is a flow chart illustrating a broadcast-controlling method according to some embodiments of the present disclosure.

FIG. 3 is a flow chart illustrating a broadcast-controlling method according to some embodiments of the present disclosure.

As shown in FIG. 3, the broadcast-controlling method includes the following actions/operations.

At block S310, the method obtains a number of broadcast types registered to be received by a first application.

At block S320, the method determines whether the number of broadcast types is greater than a first threshold.

At block S330, the method determines the first application as an illegal broadcast-registering application when the number of broadcast types is greater than the first threshold.

At block S340, the method obtains a receiver queue of a target broadcast.

At block S350, the method determines whether the illegal broadcast-registering applications in the receiver queue of the target broadcast is in the preset application list. If it is, go to block S360, otherwise go to block S370.

The preset application list may be a list of applications set before leaving the factory or during use of the user. The preset application list may include safe broadcast-registering applications, which have been identified by the system or determined according to use habits of the user, such as an input application, a browser and an image viewing application.

Since the illegal broadcast-registering applications are determined according to the number of broadcast types registered by an application, an application is defined as an illegal broadcast-registering application when the number of broadcast types registered to be received by the application exceeds the first threshold. Therefore, in the process of determining the illegal broadcast-registering application, it is highly probable that a safe and frequently-used broadcast application is defined as an illegal broadcast-registering application. The preset application list is set to avoid that a safe application registering to receive a lot of broadcasts as an illegal broadcast-registering application.

At block S360, the method remains the illegal broadcast-registering applications in the receiver queue.

When it is determined that the illegal broadcast-registering applications in the receiver queue of the target broadcast is in the preset application list, the illegal broadcast-registering applications are remained. Exemplarily, since an input application is a frequently-used application, while the number of the broadcast types registered to be received by the input application may be 50, which exceeds the first threshold value being 30, then the input application will be defined as an illegal broadcast-registering application. However, the input application is in the preset application list, and then the input application is remained in the process of optimizing the receiver queue.

At block S370, the method optimizes the receiver queue according to determined illegal broadcast-registering applications.

Based on the foregoing technical solutions, the method sends the number of the broadcast types registered to be received by the first application to the server, so that the server determines the first threshold according to the number of broadcast types registered to be received by at least one first application. A broadcast-controlling apparatus is provided according to an embodiment of the present disclosure, which includes the following:

A broadcast type quality obtaining module configured to obtain a number of broadcast types registered to be received by a first application;

An illegal broadcast-registering application determining module configured to determine whether the number of broadcast types is greater than a first threshold and determine the first application as an illegal broadcast-registering application when the number of broadcast types is greater than the first threshold;

A receiver queue obtaining module configured to obtain a receiver queue of a target broadcast; and A receiver queue optimizing module configured to optimize the receiver queue according to determined illegal broadcast-registering applications.

In one embodiment, the receiver queue optimizing module includes:

a receiver quantity determining unit configured to determine whether a number of receivers in the receiver queue is greater than a second threshold;

a receiver queue optimizing unit configured to optimize the receiver queue according to the determined illegal broadcast-registering applications when the number of receivers in the receiver queue is greater than the second threshold.

In one embodiment, the receiver queue optimizing module includes:

an illegal broadcast-registering application deleting unit configured to delete the determined illegal broadcast-registering applications from the receiver queue.

In one embodiment, the receiver queue optimizing module includes:

an associated application deleting unit configured to delete any associated application having data interaction with any of the determined illegal broadcast-registering applications from the receiver queue.

In one embodiment, the receiver queue optimizing module includes:

a preset application remaining unit configured to remain any of the determined illegal broadcast-registering applications in the receiver queue when any of the illegal broadcast-registering applications is located in a preset application list.

In one embodiment, the broadcast-controlling apparatus further includes:

a first threshold determining module configured to send the number of broadcast types registered to be received by the first application to a server, wherein the first threshold is determined by the server according to numbers of broadcast types registered to be received by at least one first application.

Figure 4:
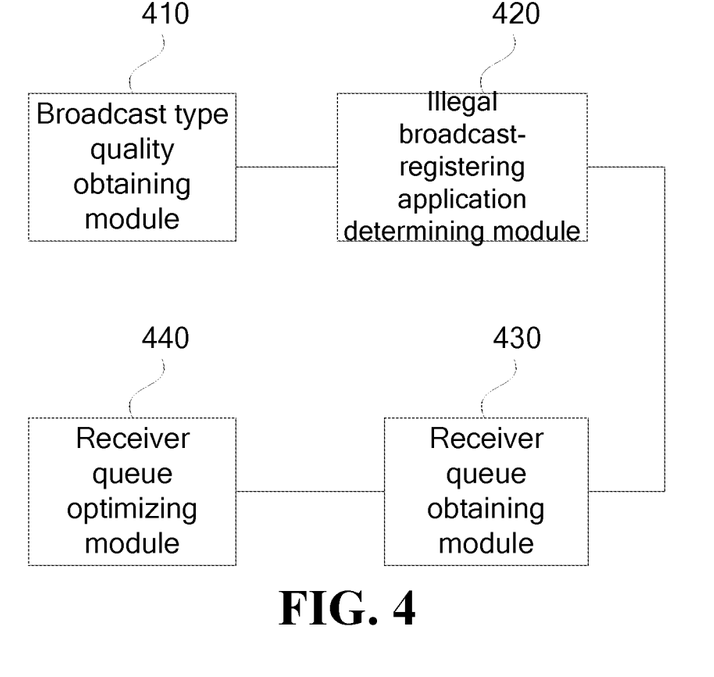
FIG. 4 is a block diagram illustrating a control apparatus for a broadcast according to some embodiments of the present disclosure.

FIG. 4 is a block diagram illustrating a control apparatus for a broadcast according to some embodiments of the present disclosure. As shown in FIG. 4, the broadcast-controlling apparatus includes the following:

a broadcast type quality obtaining module 410 configured to obtain a number of broadcast types registered to be received by a first application;

an illegal broadcast-registering application determining module 420 configured to determine whether the number of broadcast types is greater than a first threshold and determine the first application as an illegal broadcast-registering application when the number of broadcast types is greater than the first threshold;

a receiver queue obtaining module 430 configured to obtain a receiver queue of a target broadcast; and a receiver queue optimizing module 440 configured to optimize the receiver queue according to determined illegal broadcast-registering applications.

Based on the foregoing solutions, the receiver queue optimizing module 440 includes:

a receiver quantity determining unit configured to determine whether a number of receivers in the receiver queue is greater than a second threshold;

a receiver queue optimizing unit configured to optimize the receiver queue according to the determined illegal broadcast-registering applications when the number of receivers in the receiver queue is greater than the second threshold.

Based on the foregoing solutions, the receiver queue optimizing module 440 further includes:

an illegal broadcast-registering application deleting unit configured to delete the determined illegal broadcast-registering applications from the receiver queue.

Based on the foregoing solutions, the receiver queue optimizing module 440 further includes:

an associated application deleting unit configured to delete any associated application having data interaction with any of the determined illegal broadcast-registering applications from the receiver queue.

Based on the foregoing solutions, the receiver queue optimizing module 440 further includes:

a preset application remaining unit configured to remain any of the determined illegal broadcast-registering applications in the receiver queue when any of the illegal broadcast-registering applications is located in a preset application list.

Based on the foregoing solutions, the broadcast-controlling apparatus further includes a first threshold determining module configured to send the number of broadcast types registered to be received by the first application to a server, wherein the first threshold is determined by the server according to numbers of broadcast types registered to be received by at least one first application.

The above products can perform any method according to embodiments of the present disclosure, and have the corresponding function modules and beneficial effects of executing the method.

A storage medium is provided according to an embodiment of the present disclosure, which stores instructions, when executed by a processor, causing to perform a broadcast-controlling method according to embodiments of the present disclosure.

A mobile terminal is provided according to an embodiment of the present disclosure, which includes a memory, a processor, and a computer program stored in the memory and executable in the processor, wherein the processor is configured to execute the computer program to:

obtain a number of broadcast types registered to be received by a first application;

determine whether the number of broadcast types is greater than a first threshold;

determine the first application as an illegal broadcast-registering application when the number of broadcast types is greater than the first threshold;

obtain a receiver queue of a target broadcast; and optimize the receiver queue of the target broadcast according to determined illegal broadcast-registering applications.

In one embodiment, the optimizing the receiver queue according to the determined illegal broadcast-registering applications includes:

determining whether a number of receivers in the receiver queue is greater than a second threshold;

optimizing the receiver queue according to the determined illegal broadcast-registering applications when the number of receivers in the receiver queue is greater than the second threshold.

In one embodiment, the optimizing the receiver queue according to the determined illegal broadcast-registering applications includes:

deleting the determined illegal broadcast-registering applications from the receiver queue.

In one embodiment, the optimizing the receiver queue according to the determined illegal broadcast-registering applications includes:

deleting any associated application having data interaction with any of the determined illegal broadcast-registering applications from the receiver queue.

In one embodiment, the optimizing the receiver queue according to the determined illegal broadcast-registering applications includes:

remaining any of the determined illegal broadcast-registering applications in the receiver queue when any of the illegal broadcast-registering applications is located in a preset application list.

In one embodiment, the mobile terminal further includes:

sending the number of broadcast types registered to be received by the first application to a server, wherein the first threshold is determined by the server according to numbers of broadcast types registered to be received by at least one first application.

Figure 5:
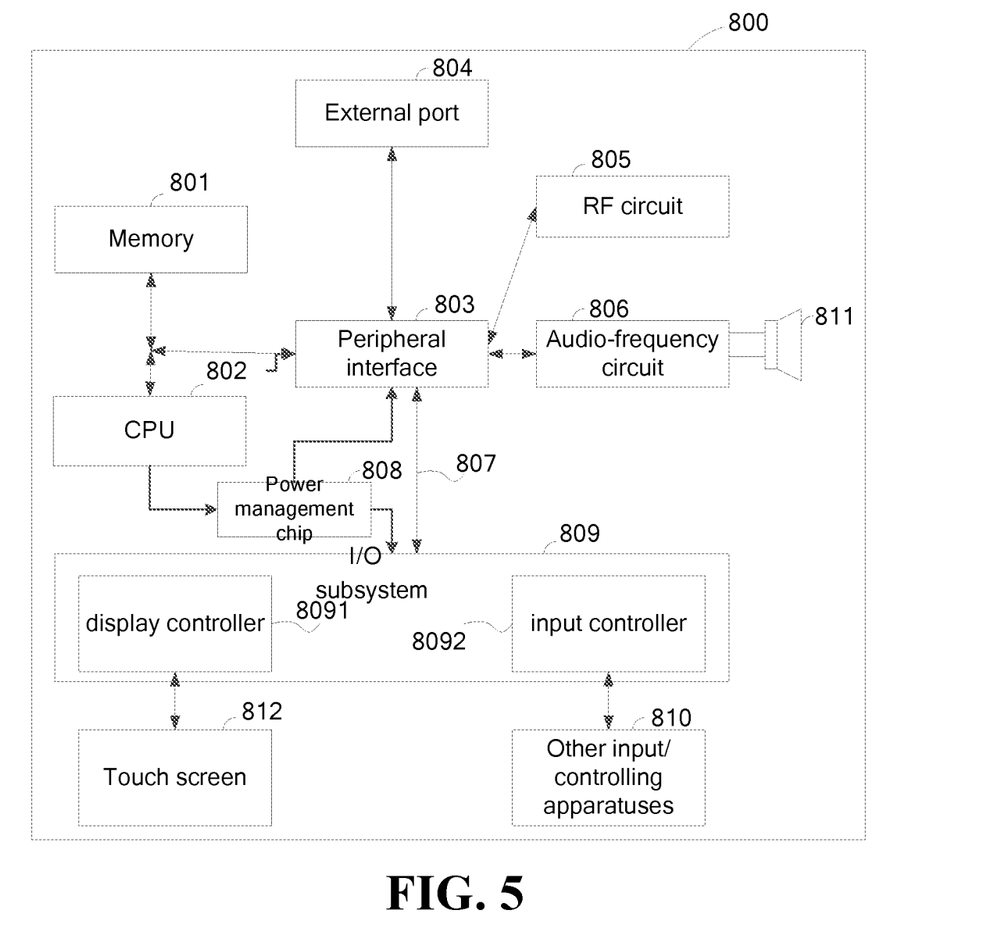
FIG. 5 is a block diagram illustrating a terminal device according to some embodiments of the present disclosure.

FIG. 5 is a block diagram illustrating a terminal device according to some embodiments of the present disclosure. As shown in FIG. 5, the terminal device may include a housing (not shown in the figure), a memory 801, a central processing unit (CPU) (also called as processor) 802, a computer program stored in the memory and executable on the CPU 802, a circuit board (not shown in the figure), and a power circuit (not shown in the figure). The circuit board may be disposed within the space defined by the housing. The CPU 802 and the non-transitory memory 801 may be arranged on the circuit board. The power circuit may provide power to each circuit or element of the terminal. The memory 801 may store executable program codes. The CPU 802 may read executable program codes stored in the memory 801 to run a corresponding program to obtain a number of broadcast types registered to be received by a first application; determine whether the number of broadcast types is greater than a first threshold; determine the first application as an illegal broadcast-registering application when the number of broadcast types is greater than the first threshold; obtain a receiver queue of a target broadcast; and optimize the receiver queue of the target broadcast according to determined illegal broadcast-registering applications.

The mobile terminal may further include a peripheral interface 803, a radio frequency (RF) circuit 805, an audio-frequency circuit 806, a loudspeaker 811, a power management chip 808, an input/output (I/O) subsystem 809, a touch screen 812, other input/controlling apparatuses 810, and an external port 804, all of which may communicate through one or more communication buses or signal lines 807.

It should be noted that, the mobile terminal 800 shown in the figure is only an example of mobile terminals, the mobile terminal 800 may contain more or less of the components than those illustrated in the figure, two or more of the components may be combined, or the arrangement of the components may be changed. The components illustrated in the figure may be realized by hardware, software, or combination thereof, wherein the hardware and software may include one or more signal processors and/or application specific integrated circuits.

The mobile terminal for implementing broadcast-controlling function according to an embodiment will be described in details herein, and a mobile phone may be used as an example of the mobile terminal.

The non-transitory memory 801 may be accessed by the CPU 802, peripheral interface 803 and the like. The non-transitory memory 801 may include high speed random access memory or non-volatile memory such as disk type storage device, a flash memory device, or other volatile solid state memory device.

The peripheral interface 803 may connect input and output of the device to the CPU 802 and the non-transitory memory 801.

The I/O subsystem 809 may set input and output peripheral. For example, the touch screen 812 and other input/controlling apparatuses 810 may be connected to the peripheral interface 803. The I/O subsystem 809 may include a display controller 8091 and one or more input controllers 8092 to control other input/controlling devices 810. The one or more input controllers 8092 may receive electrical signals from other input/controlling devices 810 or send electrical signals to other input/controlling devices 810, wherein the other input/controlling devices 810 may include a physical button (a pressing button, a rocker button and the like), a dial plate, a sliding switch, a joystick, or a clicking wheel. To be noted that, the input controller 8092 may connect to any one of the following: a keyboard, an infrared port, an USB interface, and an indicating equipment such as a mouse.

According to the working principle of the touch screen and mediums for transmitting information, the touch screen 812 can be a resistive type, a capacitive inductive type, an infrared type or a surface acoustic wave type. According to the installation manner, the touch screen 812 can be external, built-in or integrated. According to the technical principle, the touch screen 812 can be a vector pressure sensing technology touch screen, a resistive technology touch screen, a capacitive technology touch screen, an infrared technology touch screen or a surface acoustic wave technology touch screen.

The touch screen 812 may an input interface and an output interface between a user and the mobile terminal of the user. Visual output may be displayed to the user, wherein the visual output may include a graph, a text, an icon, a video, and the like. Optionally, the touch screen 812 sends an electrical signal (such as an electrical signal of the contact surface) triggered by the user on the touch screen to the processor 802.

The display controller 8091 of the I/O subsystem 809 may receive electrical signals from the touch screen 812 or send electrical signals to the touch screen 812. The touch screen 812 may detect touching of the screen, the display controller 8091 may convert the detected touching into an interaction with a user interface object displayed on the touch screen 812, which realizes human-computer interaction. The user interface object displayed on the touch screen 812 may be an icon for running a game, an icon for connecting into a certain network, and the like. To be noted that, the device may also include an optical mouse, which is a touch-sensitive surface without display of visual output or an extension of the touch-sensitive surface defined by the touch screen.

The RF circuit 805 may be used to establish communication between the mobile phones and wireless network (i.e. a network side), realizing data receipt and sending between the mobile phone and the wireless network. For example, receiving and sending messages, emails and the like.

The audio-frequency circuit 806 may mainly be configured to receive audio-frequency data from the peripheral interface 803, and convert the audio-frequency data into electrical signals, which may be sent to the loudspeaker 811.

The loudspeaker 811 may reconvert the audio signals received from the wireless network through the RF circuit 805 of the mobile phone into the sound, and play the sound to the user.

The power management chip 808 may supply power to hardware connected through the CPU 802, the I/O subsystem and the peripheral interface, and perform power management.

The CPU 802 in the embodiment is configured to the following actions/operations.

obtain a number of broadcast types registered to be received by a first application;

determine whether the number of broadcast types is greater than a first threshold;

determine the first application as an illegal broadcast-registering application when the number of broadcast types is greater than the first threshold;

obtain a receiver queue of a target broadcast; and optimize the receiver queue of the target broadcast according to determined illegal broadcast-registering applications.

In one embodiment, the optimizing the receiver queue according to the determined illegal broadcast-registering applications includes:

determining whether a number of receivers in the receiver queue is greater than a second threshold;

optimizing the receiver queue according to the determined illegal broadcast-registering applications when the number of receivers in the receiver queue is greater than the second threshold.

In one embodiment, the optimizing the receiver queue according to the determined illegal broadcast-registering applications includes:

deleting the determined illegal broadcast-registering applications from the receiver queue.

In one embodiment, the optimizing the receiver queue according to the determined illegal broadcast-registering applications includes:

deleting any associated application having data interaction with any of the determined illegal broadcast-registering applications from the receiver queue.

In one embodiment, the optimizing the receiver queue according to the determined illegal broadcast-registering applications includes:

remaining any of the determined illegal broadcast-registering applications in the receiver queue when any of the illegal broadcast-registering applications is located in a preset application list.

In one embodiment, the mobile terminal further includes:

sending the number of broadcast types registered to be received by the first application to a server, wherein the first threshold is determined by the server according to numbers of broadcast types registered to be received by at least one first application.

It should be noted that, the mobile terminal may further include a camera, a Bluetooth module, and the like, which are not described herein.

It should be noted that, for the broadcast-controlling method according to the embodiments of the present disclosure, a person skilled in the art may understand all or part of the process for implementing the broadcast-controlling method according to the embodiments of the present disclosure may be completed by a computer program controlling related hardware. The computer program can be stored in a computer readable storage medium, such as in a memory, and executed by at least one processor, and the executing process may include processes such as an implementation of the broadcast-controlling method. The storage medium may be a magnetic disk, an optical disk, a read only memory (ROM), a random access memory (RAM) and the like.

It should be noted that, the above description is only about preferred embodiments of the present disclosure and implemented technical principles. Those skilled in the art may understand that the present disclosure should not be limited to the specific embodiments described herein. Those skilled in the art shall be able to perform various obvious modifications, re-adjustment and replacement to the embodiments without departing from the scope of the present disclosure. Therefore, although the present disclosure may be described in details through the above-mentioned embodiments, the present disclosure should not be limited to the above-mentioned embodiments. Without departing from the concepts of the present disclosure, many other equivalent embodiments may also be included, and the scope of the present disclosure is defined by the claims.

What is claimed is:

1. A broadcast-controlling method in an operating system, comprising:

obtaining a number of broadcast types registered by a first application, wherein the first application receives broadcast messages according to the registered broadcast types;

determining whether the number of broadcast types is greater than a first threshold;

determining the first application as an illegal broadcast-registering application when the number of broadcast types is greater than the first threshold;

obtaining a receiver queue of a target broadcast containing all applications that register to receive the target broadcast, wherein each illegal broadcast-registering application is an illegal application that self-starts by receiving the target broadcast in a background and occupies the receiver queue;

deleting determined illegal broadcast-registering applications from the receiver queue;

deleting any associated application having data interaction with any of the determined illegal broadcast-registering applications from the receiver queue; and moving the determined illegal broadcast-registering applications toward a tail of the receiver queue such that the receiver queue is rearranged.

2. The broadcast-controlling method of claim 1, further comprising:

determining whether a number of receivers in the receiver queue is greater than a second threshold, wherein the second threshold is determined by a period in which all the receivers in the receiver queue receive or respond to the broadcast; and optimizing the receiver queue according to the determined illegal broadcast-registering applications when the number of receivers in the receiver queue is greater than the second threshold.

3. The broadcast-controlling method of claim 1, further comprising:

leaving any of the determined illegal broadcast-registering applications in the receiver queue when the any of the illegal broadcast-registering applications is located in a preset application list.

4. The broadcast-controlling method of claim 3, wherein the preset application list comprises safe broadcast-registering applications which have been identified by the operating system or determined according to use habits of a target user.

5. The broadcast-controlling method of claim 1, wherein the determined illegal broadcast-registering applications are rearranged at the tail of the receiver queue.

6. The broadcast-controlling method of claim 1, further comprising:

sending the number of broadcast types registered by the first application to a server, wherein the first threshold is determined by the server according to numbers of broadcast types registered by at least one application.

7. A mobile terminal, comprising a non-transitory memory storing a computer program, and a processor, wherein the processor is configured to execute the computer program to a broadcast-controlling method, and the method comprises:

obtaining a receiver queue of a target broadcast containing all applications that register to receive the target broadcast;

deleting illegal broadcast-registering applications from the receiver queue, wherein a first application registering to receive a number of broadcast types greater than a first threshold in the receiver queue is determined as the illegal broadcast-registering application, and wherein each illegal broadcast-registering application is an illegal application that self-starts by receiving the target broadcast in a background and occupies the receiver queue;

deleting any associated application having data interaction with any of the illegal broadcast-registering applications from the receiver queue; and moving the illegal broadcast-registering applications toward a tail of the receiver queue such that the receiver queue is rearranged.

8. The mobile terminal of claim 7, wherein the receiver queue is optimized when a number of receivers in the receiver queue is greater than a second threshold.

9. The mobile terminal of claim 8, wherein the second threshold is determined by a period in which all the receivers in the receiver queue receive or respond the target broadcast.

10. The mobile terminal of claim 7, further comprising:
leaving any of determined illegal broadcast-registering applications in the receiver queue when the any of the determined illegal broadcast-registering applications is located in a preset application list.

11. The mobile terminal of claim 10, wherein the preset application list comprises safe broadcast-registering applications which have been identified by the operating system or determined according to use habits of a target user.

12. The mobile terminal of claim 7, wherein the determined illegal broadcast-registering applications are rearranged at the tail of the receiver queue.

13. A non-transitory storage medium storing a computer program, when executed, causing a processor to perform a broadcast-controlling method, wherein the method comprises:

obtaining a receiver queue of a target broadcast containing all applications that register to receive the target broadcast;

disabling an illegal receiver in the receiver queue to receive the target broadcast, wherein the illegal receiver in the receiver queue registers to receive a number of broadcast types greater than a first threshold, and wherein the illegal receiver is an illegal application that self-starts by receiving the target broadcast in a background and occupies the receiver queue;

deleting any associated application having data interaction with the illegal receiver from the receiver queue; and moving the illegal receiver toward a tail of the receiver queue such that the receiver queue is rearranged.

* * * * *